(12) United States Patent
Bost et al.

(10) Patent No.: US 9,688,040 B2
(45) Date of Patent: Jun. 27, 2017

(54) METHOD OF PREPARING A CLOSURE FOR A PRODUCT-RETAINING CONTAINER

(71) Applicant: Nomacorc LLC, Zebulon, NC (US)

(72) Inventors: Damon James Bost, Wake Forest, NC (US); Nisha Amol Keskar, Wake Forest, NC (US)

(73) Assignee: NOMACORC LLC, Zebulon, NC (US)

( * ) Notice: Subject to any disclaimer, the term of this patent is extended or adjusted under 35 U.S.C. 154(b) by 497 days.

(21) Appl. No.: 13/911,477

(22) Filed: Jun. 6, 2013

(65) Prior Publication Data

US 2013/0328232 A1    Dec. 12, 2013

Related U.S. Application Data

(60) Provisional application No. 61/657,298, filed on Jun. 8, 2012.

(51) Int. Cl.
| | | |
|---|---|---|
| *B29C 47/00* | (2006.01) | |
| *B29D 99/00* | (2010.01) | |
| *B65D 39/00* | (2006.01) | |
| *B26D 1/29* | (2006.01) | |
| *B26D 3/16* | (2006.01) | |

(Continued)

(52) U.S. Cl.
CPC ........... *B29D 99/0096* (2013.01); *B26D 1/29* (2013.01); *B26D 3/16* (2013.01); *B65D 39/0029* (2013.01); *B65D 39/0076* (2013.01); *B26D 2001/006* (2013.01); *B29C 47/0016* (2013.01); *B29C 47/0066* (2013.01); *B29C 2793/0027* (2013.01); *B29L 2031/565* (2013.01); *B65D 2539/008* (2013.01)

(58) Field of Classification Search
CPC ......... B29C 44/00; B29C 44/20; B29C 47/00; B29C 47/0004; B29C 47/0009; B29C 47/0016; B29C 47/0042; B29C 47/0066; B29D 99/0096; B26D 1/00; B65D 39/00
USPC .............................. 264/145, 148, 41, 176.1
See application file for complete search history.

(56) References Cited

U.S. PATENT DOCUMENTS

| | | | |
|---|---|---|---|
| 3,135,410 A | | 6/1964 | Federighi |
| 3,651,841 A | * | 3/1972 | Ohlsson ................. B23D 61/02 83/835 |
| 4,134,491 A | | 1/1979 | Turillon et al. |

(Continued)

FOREIGN PATENT DOCUMENTS

| | | |
|---|---|---|
| AU | 2012224574 A1 | 5/2013 |
| CN | 1124968 A | 6/1996 |

(Continued)

OTHER PUBLICATIONS

International Search Report and Written Opinion for PCT/US13/44475 mailed Oct. 10, 2013, 10 pages.

(Continued)

*Primary Examiner* — Christina Johnson
*Assistant Examiner* — Xue Liu
(74) *Attorney, Agent, or Firm* — Withrow & Terranova, P.L.L.C.

(57) ABSTRACT

A method of preparing a closure for a product retaining container is disclosed along with the closure that is obtainable by the method. The present disclosure also relates to a use, in the manufacture of a closure, of a knife blade comprising a cutting edge region having a discontinuous cutting edge.

28 Claims, 4 Drawing Sheets

(51) Int. Cl.
B29L 31/56 (2006.01)
B26D 1/00 (2006.01)

(56) References Cited

U.S. PATENT DOCUMENTS

| | | |
|---|---|---|
| 4,150,744 A | 4/1979 | Fennimore |
| 5,024,130 A | 6/1991 | Hays, Jr. |
| 5,179,171 A | 1/1993 | Minami et al. |
| 5,480,915 A | 1/1996 | Burns |
| 5,904,965 A | 5/1999 | Noel et al. |
| 6,022,816 A | 2/2000 | Dewar |
| 6,085,923 A | 7/2000 | Yaniger |
| 6,153,275 A | 11/2000 | Yaniger |
| 6,221,450 B1 | 4/2001 | Noel et al. |
| 6,221,451 B1 | 4/2001 | Lauer et al. |
| 6,355,320 B1 | 3/2002 | Allman et al. |
| 6,548,598 B2 | 4/2003 | Takeuchi et al. |
| 6,613,406 B1 | 9/2003 | Yaniger |
| 7,285,315 B2 | 10/2007 | Fragola |
| 7,314,661 B2 | 1/2008 | Hueto |
| 7,770,747 B2 | 8/2010 | Lauer et al. |
| 8,063,163 B2 | 11/2011 | Hatke et al. |
| 2002/0103275 A1 | 8/2002 | Nogueria de Sousa |
| 2005/0137073 A1 | 6/2005 | Weaver |
| 2005/0208244 A1 | 9/2005 | Delmas |
| 2006/0006132 A1 | 1/2006 | Lauer et al. |
| 2006/0021487 A1 | 2/2006 | Dickover et al. |
| 2007/0071939 A1 | 3/2007 | Hueto |
| 2007/0128387 A1 | 6/2007 | Unwin et al. |
| 2007/0163128 A1* | 7/2007 | Tarrerias ............... B23D 65/00 30/350 |
| 2008/0000337 A1 | 1/2008 | Dickover et al. |
| 2008/0229569 A1 | 9/2008 | Romao de Sousa |
| 2008/0300345 A1 | 12/2008 | Pfaadt |
| 2010/0200606 A1 | 8/2010 | Davis et al. |
| 2011/0184082 A1 | 7/2011 | Wright et al. |
| 2012/0021151 A1 | 1/2012 | Tatarka et al. |
| 2013/0118924 A1 | 5/2013 | Vidal et al. |
| 2013/0327739 A1 | 12/2013 | Davidts et al. |
| 2014/0299570 A1 | 10/2014 | Davidts et al. |

FOREIGN PATENT DOCUMENTS

| | | | |
|---|---|---|---|
| CN | 2380584 Y | 5/2000 | |
| CN | 1362929 A | 8/2002 | |
| CN | 1486266 A | 3/2004 | |
| CN | 1900405 A | 1/2007 | |
| CN | 101203438 A | 6/2008 | |
| CN | 101384666 A | 3/2009 | |
| CN | 101558120 A | 10/2009 | |
| CN | 101861274 A | 10/2010 | |
| CN | 102361801 A | 2/2012 | |
| CN | 102388241 A | 3/2012 | |
| CN | 102707022 A | 10/2012 | |
| DE | 2928499 A1 | 11/1980 | |
| DE | 202009012131 U1 | 3/2010 | |
| EP | 1908567 A1 | 4/2008 | |
| FR | 2441467 A1 * | 6/1980 | ........... B26B 11/006 |
| FR | 2703028 A1 | 9/1994 | |
| FR | 2799183 A1 | 4/2001 | |
| FR | 2850634 A1 | 8/2004 | |
| GB | 1499852 | 2/1978 | |
| JP | 2003081297 A | 3/2003 | |
| JP | 2006275751 A | 10/2006 | |
| WO | 9425513 A1 | 11/1994 | |
| WO | 9847783 A1 | 10/1998 | |
| WO | 03018304 A1 | 3/2003 | |
| WO | 03082700 A1 | 10/2003 | |
| WO | 2006094529 A1 | 9/2006 | |
| WO | 2007040608 A1 | 4/2007 | |
| WO | 2008048129 A1 | 4/2008 | |
| WO | 2009063095 A2 | 5/2009 | |
| WO | 2010092046 A1 | 8/2010 | |
| WO | 2012120109 A1 | 9/2012 | |

OTHER PUBLICATIONS

Alonso, Angeles et al., "Determination of Antioxidant Power of Red and White Wines by a New Electrochemical Method and Its Correlation with Polyphenolic Content," Journal of Agricultural and Food Chemistry, vol. 50, American Chemical Society, Apr. 30, 2002, pp. 3112-3115.

Celotti, Emilio et al., "The analytical evaluation of wine oxidability," The Australian & New Zealand Grapegrower & Winemaker, Ryan Publications Pty. Ltd., Feb. 2006, pp. 47-52.

Kilmartin, Paul et al., "A Cyclic Voltammetry Method Suitable for Characterizing Antioxidant Properties of Wine and Wine Phenolics," Journal of Agricultural and Food Chemistry, vol. 49, American Chemical Society, Mar. 10, 2001, pp. 1957-1965.

Rodrigues, Astride et al., "Resistance to Oxidation of White Wines Assessed by Voltammetric Means," Journal of Agricultural and Food Chemistry, vol. 55, American Chemical Society, Nov. 23, 2007, pp. 10557-10562.

International Search Report and Written Opinion for PCT/US2013/071242 mailed Jan. 16, 2014, 11 pages.

Diéval et al., "Measurement of the Oxygen Transmission Rate of Co-extruded Wine Bottle Closures Using a Luminescence-Based Technique", Packaging Technology and Science—Wiley Online Library, 2011, www.wileyonlinelibrary.com, 11 pages.

International Search Report for PCT/EP2012/072155, mailed Feb. 15, 2013, 11 pages.

Author Unknown, "Standard Test Method for Oxygen Transmission Rate Through Dry Packages Using a Coulometric Sensor," ASTM Standard F1307-02, ASTM International, 2007, 7 pages.

Avramescu, Alina et al., "Screen-printed biosensors for the control of wine quality based on lactate and acetaldehyde determination," Analytica Chimica Acta, vol. 458, Elsevier Science B.V., Apr. 29, 2002, pp. 203-213.

Caille, Soline et al., "Sensory characteristics changes of red Grenache wines submitted to different oxygen exposures pre and post bottling," Analytica Chimica Acta, vol. 660, Elsevier B.V., Available online Dec. 3, 2009, pp. 35-42.

Crank, John, "The Mathematics of Diffusion (Second Edition)," Clarendon Press, Oxford, 1975, pp. 45-53.

Crochiere, George K., "Measuring oxygen ingress during bottling/storage," Practical Winery and Vineyard Journal, Wine Communications Group, Jan./Feb. 2007, pp. 74-84.

Du Toit, W.J. et al., "Oxygen in Must and Wine: A review," South African Journal of Enology and Viticulture, vol. 27, No. 1, 2006, pp. 76-94.

Barroso, M.F. et al., "Towards a reliable technology for antioxidant capacity and oxidative damage evaluation: Electrochemical (bio)sensors," Biosensors and Bioelectronics, vol. 30, Issue 1, Elsevier B.V., Available online Sep. 3, 2011, pp. 1-12.

Godden, Peter et al., "Wine bottle closures: physical characteristics and effect on composition and sensory properties of a Semillon wine, 1. Performance up to 20 months post-bottling," Australian Journal of Grape and Wine Research, vol. 7, Issue 2, Jul. 2001, pp. 64-1055.

Guan, Wen-Jun et al., "Glucose biosensor based on multi-wall carbon nanotubes and screen printed carbon electrodes," Biosensors and Bioelectronics, vol. 21, Issue 3, Elsevier B.V., Sep. 15, 2005, pp. 508-512.

Liu, Jifeng et al., "Antioxidant Redox Sensors Based on DNA Modified Carbon Screen-Printed Electrodes," Analytical Chemistry, vol. 78, No. 19, American Chemical Society, Oct. 1, 2006, pp. 6879-6884.

Liu, Jifeng et al., "Antioxidant Sensors Based on DNA Modified Electrodes," Analytical Chemistry, vol. 77, No. 23, American Chemical Society, Dec. 1, 2005, pp. 7687-7694.

Lopes, Paulo et al., "Impact of Oxygen Dissolved at Bottling and Transmitted through Closures on the Composition and Sensory Properties of a Sauvignon Blanc Wine during Bottle Storage," Journal of Agricultural and Food Chemistry, vol. 57, No. 21, American Chemical Society, Nov. 11, 2009, pp. 10261-10270.

(56) References Cited

OTHER PUBLICATIONS

Lopes, Paulo et al., "Main Routes of Oxygen Ingress through Different Closures into Wine Bottles," Journal of Agricultural and Food Chemistry, vol. 55, No. 13, American Chemical Society, Jun. 27, 2007, pp. 5167-5170.
Lopes, Paulo et al., "Nondestructive Colorimetric Method to Determine the Oxygen Diffusion Rate through Closures Used in Winemaking," Journal of Agricultural and Food Chemistry, vol. 53, No. 18, American Chemical Society, Sep. 7, 2005, pp. 6967-6973.
Lundquist, L. et al., "Oxygen Transmission Rate Measurement Using Oxygen Sensitive Fluorescent Tracers," Presented at the Technical Association of the Pulp and Paper Industry PLACE Division Conference, Aug. 29-Sep. 2, 2004, Indianapolis, Indiana, 13 pages.
Makhotkina, Olga, "Uncovering the influence of antioxidants on polyphenol oxidation in wines using an electrochemical method: Cyclic voltammetry," Journal of Electroanalytical Chemistry, vol. 633, Elsevier B.V., Available online May 27, 2009, pp. 165-174, 2009.
Mello, L.D., "Biosensors as a tool for the antioxidant status evaluation," Talanta, vol. 72, Elsevier B.V., Available online Jan. 4, 2007, pp. 335-348.
Pocas, Maria F. et al., "Measurement of Oxygen Transmission Rate through Foamed Materials for Bottle Closures," Packaging Technology and Science, vol. 23, Issue 1, John Wiley & Sons, Ltd., Jan./Feb. 2010, pp. 27-33.
Rabiot, Dominique et al., "Study of the Oxygen Transfer Through Synthetic Corks for Wine Conservation," American Institute of Chemical Engineers, Jan. 1, 1999, 15 pages.
Skouroumounis, George et al., "Oxygen ingress into bottled wine," Practical Winery and Vineyard Journal, Wine Communications Group, Jul./Aug. 2008, pp. 6-14.
Silva Ferreira, Antonio Cesar et al., "Identification of Key Odorants Related to the Typical Aroma of Oxidation-Spoiled White Wines," Journal of Agricultural and Food Chemistry, vol. 51, No. 5, American Chemical Society, Feb. 26, 2003, pp. 1377-1381.
Squarzoni, Margherita et al., "Innovative method for the evaluation of oxygen barrier properties of some different kinds of wine stoppers," Industrie delle Bevande, vol. 33, Apr. 2004, pp. 113-116.
Wirth, J. et al., "The impact of oxygen exposure before and after bottling on the polyphenolic composition of red wines," Food Chemistry, vol. 123, Elsevier Ltd., Nov. 1, 2010, pp. 107-116.
Australian Patent Examination Report for Patent Application No. 2013204683 mailed Mar. 21, 2014, 4 pages.
International Search Report and Written Opinion for PCT/US2014/015313 mailed May 23, 2014, 10 pages.
International Search Report and Written Opinion for PCT/US2014/033177 mailed Jun. 6, 2014, 10 pages.
Non-final Office Action for U.S. Appl. No. 13/674,164 mailed Jul. 7, 2014, 11 pages.
International Preliminary Report on Patentability for PCT/US2014/033177, mailed Oct. 15, 2015, 8 pages.
Non-Final Office Action for U.S. Appl. No. 14/175,266, mailed Sep. 16, 2015, 9 pages.
Notification of the First Office Action for Chinese Patent Application No. 201380039735.9, issued Sep. 15, 2015, 25 pages.
Notification of the First Office Action for Chinese Patent Application No. 201480001531.0, issued Oct. 8, 2015, 23 pages.
European Patent Examination Report for European Patent Application No. 12787419.6, mailed May 27, 2015, 4 pages.
Non-Final Office Action for U.S. Appl. No. 13/911,434, mailed Jul. 14, 2015, 14 pages.
International Preliminary Report on Patentability for PCT/US2013/071242, mailed Jun. 4, 2015, 7 pages.
ASTM Standard D792,"Standard Test Methods for Density and Specific Gravity (Relative Density) of Plastics by Displacement," ASTM International, 2013, 6 pages.
ASTM Standard D1238,"Standard Test Method for Melt Flow Rates of Thermoplastics by Extrusion Plastometer," ASTM International, 2013, 16 pages.

ASTM Standard D1525, "Standard Test Method for Vicat Softening Temperature of Plastics," ASTM International, 2009, 10 pages.
ASTM Standard D1928, "Standard Practice for Preparation of Compression-Molded Polyethylene Test Sheets and Test Specimens," ASTM International, 1996, 7 pages.
ISO Standard 306, "Plastics—Thermoplastic materials—Determination of Vicat softening temperature (VST)," International Organization for Standardization, 2013, 24 pages.
ISO Standard 527, "Plastics—Determination of tensile properties—Part 1: General principles," International Organization for Standardization, 2012, 28 pages.
ISO Standard 815, "Rubber, vulcanized or thermoplastic—Determination of compression set—Part 1: At ambient or elevated temperatures," International Organization for Standardization, 2014, 18 pages.
ISO Standard 868, "Plastics and ebonite—Determination of indentation hardness by means of a durometer (Shore hardness)," International Organization for Standardization, 2003, 6 pages.
ISO Standard 1183, "Plastics—Methods for determining the density of non-cellular plastics—Part 1: Immersion method, liquid pyknometer method and titration method," International Organization for Standardization, 2012, 16 pages.
ISO Standard 2030, "Granulated cork—Size analysis by mechanical sieving," International Organization for Standardization, 1990, 4 pages.
Martins, Rui C. et al., "Oxidation Management of White Wines Using Cyclic Voltammetry and Multivariate Process Monitoring," Journal of Agricultural and Food Chemistry, vol. 56, American Chemical Society, Nov. 19, 2008, pp. 12092-12098.
Prieto-Simón, B. et al., "Electrochemical biosensors as a tool for antioxidant capacity assessment," Sensors and Actuators B: Chemical, vol. 129, Issue 1, Elsevier B.V., Jan. 29, 2008, pp. 459-466.
International Preliminary Report on Patentability for International Patent Application No. PCT/EP2013/061433, mailed Oct. 21, 2014, 17 pages.
Australian Patent Examination Report for Australian Patent Application No. 2013204654, mailed Jan. 21, 2015, 3 pages.
International Preliminary Report on Patentability for International Patent Application No. PCT/US2013/044475, mailed Dec. 18, 2014, 9 pages.
Final Office Action for U.S. Appl. No. 13/674,164, mailed Mar. 27, 2015, 12 pages.
Canadian Examination Search Report for Canadian Patent Application No. 2,855,255, mailed Jan. 27, 2015, 4 pages.
Australian Patent Examination Report for Australian Patent Application No. 2013204648, mailed Jan. 22, 2015, 4 pages.
Non-final Office Action for U.S. Appl. No. 13/911,434, mailed Jan. 29, 2015, 19 pages.
Notification of the First Office Action for Chinese Patent Application No. 2012800668445, issued Jul. 27, 2015, 35 pages.
Final Office Action for U.S. Appl. No. 13/911,434, mailed May 5, 2016, 15 pages.
Final Office Action for U.S. Appl. No. 14/175,266, mailed Apr. 19, 2016, 9 pages.
Non-Final Office Action for U.S. Appl. No. 13/674,164, mailed Jan. 8, 2016, 14 pages.
Maren, "Wine Cork Wreath—Part 1," a constant project, Nov. 2, 2010, 3 pages, http://aconstantproject.blogspot.de/2010/11/wine-cork-wreath-part-1.html.
Extended European Search Report for European Patent Application No. 13800082.3, mailed Feb. 26, 2016, 6 pages.
International Preliminary Report on Patentability for PCT/US2014/015313, completed Jul. 7, 2015, 18 pages.
English Translation of Notification of the First Office Action for Chinese Patent Application No. 201380060842.X, issued Mar. 2, 2016, 14 pages.
Non-Final Office Action for U.S. Appl. No. 14/086,367, mailed Aug. 26, 2016, 7 pages.
Advisory Action and Examiner-Initiated Interview Summary for U.S. Appl. No. 13/911,434, mailed Aug. 26, 2016, 6 pages.
Advisory Action for U.S. Appl. No. 14/175,266, mailed Aug. 9, 2016, 3 pages.

(56) References Cited

OTHER PUBLICATIONS

Final Office Action for U.S. Appl. No. 13/674,164, mailed Sep. 23, 2016, 13 pages.
Non-Final Office Action for U.S. Appl. No. 14/246,627, mailed Oct. 12, 2016, 18 pages.
Notification of the Second Office Action for Chinese Patent Application No. 201480001531.0, issued Jul. 18, 2016, 22 pages.

* cited by examiner

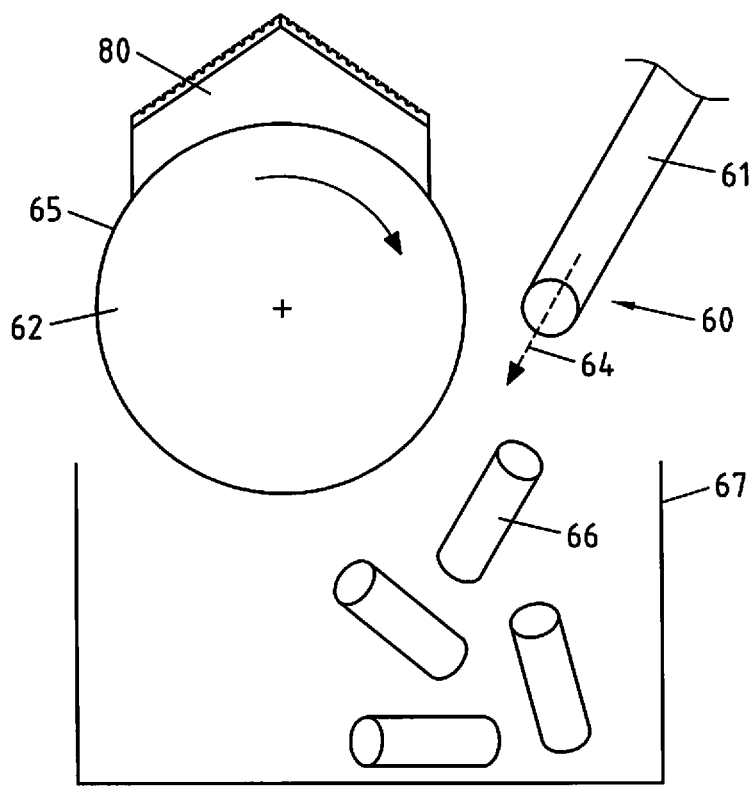
Fig. 8
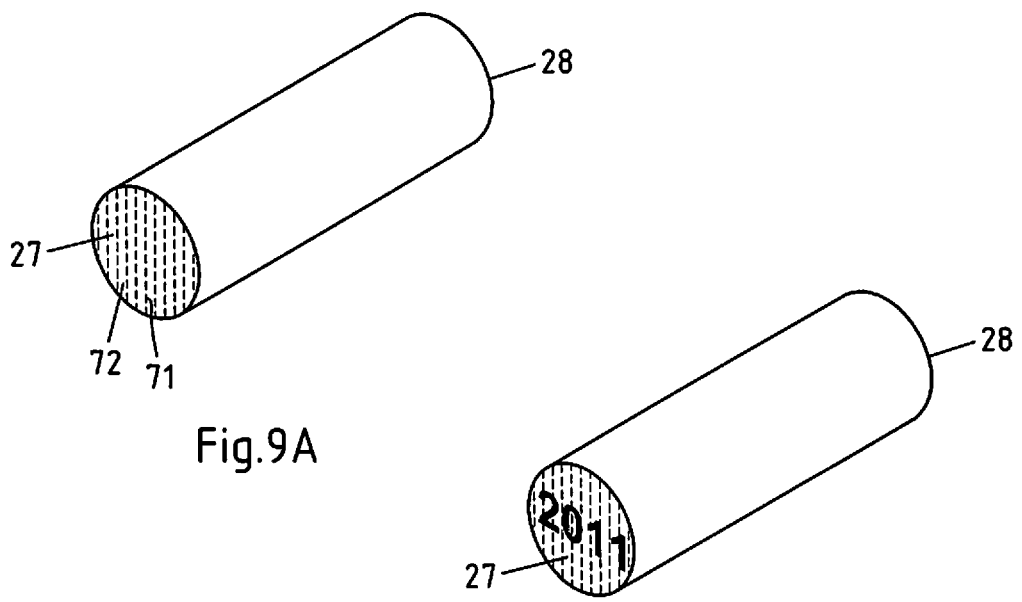
Fig. 9A
Fig. 9B

US 9,688,040 B2

METHOD OF PREPARING A CLOSURE FOR A PRODUCT-RETAINING CONTAINER

PRIORITY APPLICATION

The present application claims priority to U.S. Provisional Patent Application No. 61/657,298 entitled "METHOD OF PREPARING A CLOSURE FOR A PRODUCT-RETAINING CONTAINER," filed Jun. 8, 2012, which is incorporated herein by reference in its entirety.

RELATED APPLICATION

The present application is also related to U.S. Provisional Patent Application No. 61/657,287 entitled "CLOSURE FOR A PRODUCT-RETAINING CONTAINER," filed Jun. 8, 2012, which is incorporated herein by reference in its entirety.

FIELD OF THE DISCLOSURE

The present disclosure relates to a method of preparing a closure for a product retaining container and to a closure that is obtainable by a method of the present disclosure. The present disclosure also relates to a use, in the manufacture of a closure, of a knife blade comprising a cutting edge region having a discontinuous cutting edge.

BACKGROUND

In view of the wide variety of products that are sold for being dispensed from containers, particularly containers with round necks which define the dispensing portal, numerous constructions have evolved for container stoppers or closure means for the portals, including for example screw caps, stoppers, corks and crown caps, to name a few. Generally, products such as vinegar, vegetable oils, laboratory liquids, detergents, honey, condiments, spices, alcoholic beverages, and the like, have similar needs regarding the type and construction of the closure means used for containers for these products. However, wine sold in bottles represents the most demanding product in terms of bottle closure technology. In an attempt to best meet these demands, most wine bottle closures or stoppers have been produced from a natural material known as "cork".

While natural cork still remains a dominant material for wine closures, synthetic wine closures have become increasingly popular over the last years, largely due to the shortage in high quality natural cork material and the awareness of wine spoilage as a result of "cork taint", a phenomenon that is associated with natural cork materials. In addition, synthetic closures have the advantage that by means of closure technology, their material content and physical characteristics can be designed, controlled and fine-tuned to satisfy the varying demands that the wide range of different wine types produced throughout the world impose on closures.

One of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members are generally independent of each other and separately movable in order to enable the closure member to be compressed to the substantially reduced diameter, each jaw member comprises a sharp edge which is brought into direct engagement with the closure member when the closure member is fully compressed. Depending upon the composition of the closure member, score lines are frequently formed on the outer surface of the closure member, which prevents a complete, leak-free seal from being created when the closure member expands into engagement with the bottle neck.

Thus, it is generally desirable that any synthetic bottle closure be able to withstand this conventional bottling and sealing method. Furthermore, many cork sealing members also incur damage during the bottling process, resulting in leakage or tainted wine.

Another issue in the wine industry is the capability of the wine stopper to withstand a pressure build up that can occur during the storage of the wine product after it has been bottled and sealed. Due to natural expansion of the wine during hotter months, pressure builds up, which can result in the bottle stopper being displaced from the bottle. As a result, it is generally desirable that the bottle stopper employed for wine products be capable of secure, intimate, frictional engagement with the bottle neck in order to resist any such pressure build up.

A further issue in the wine industry is the general desirability that secure, sealed engagement of the stopper with the neck of the bottle be achieved quickly, if not virtually immediately after the stopper is inserted into the neck of the bottle. During normal wine processing, the stopper is compressed, as detailed above, and inserted into the neck of the bottle to enable the stopper to expand in place and seal the bottle. However, such expansion desirably occurs immediately upon insertion into the bottle since many processors tip the bottle onto its side or neck down after the stopper is inserted into the bottle neck, allowing the bottle to remain stored in this position for extended periods of time. If the stopper is unable to rapidly expand into secure, intimate, frictional contact and engagement with the walls of the neck of the bottle, wine leakage can occur.

It is further desirable that the closure be removable from the bottle using a reasonable extraction force. Although actual extraction forces extend over a wide range, the generally accepted, conventional extraction force is typically below 100 pounds.

In achieving a commercially viable stopper or closure, a careful balance must be made between secure sealing and providing a reasonable extraction force for removal of the closure from the bottle. Since the these two characteristics are believed to be in direct opposition to each other, a careful balance must be achieved so that the stopper or closure is capable of securely sealing the wine in the bottle, preventing both leakage and gas transmission, while also being removable from the bottle without requiring an excessive extraction force.

Furthermore, it is generally desirable that the closure has a low oxygen permeability. Too much oxygen can cause the premature spoilage of wine. In fact, oxidation may occur over a period of time to render the beverage undrinkable. Thus, it is desirable to effectively prevent or reduce oxygen from entering the bottle in order to extend and preserve the freshness and shelf life of the product. Any commercially viable wine stopper or closure should therefore generally have a low oxygen transfer rate (OTR).

In addition to the above, it is often desirable for synthetic closures to resemble natural cork closures as closely as possible in appearance. Both the longitudinal surface and the flat ends of cylindrical cork closures generally have an irregular appearance, for example showing naturally occurring irregularities in color, structure and profile. Methods have been developed for providing synthetic closures with a physical appearance similar to natural cork, for example by blending colors to produce a streaking effect in the outer portion of the closure, along the cylindrical axis. However, no method has yet been disclosed by means of which the flat terminating ends of a synthetic closure can be provided with a physical appearance similar to natural cork.

It is, furthermore, often desirable to provide decorative indicia such as letters and ornaments on the surface of wine stoppers (e.g. the crest or emblem of a winery). Natural corks are generally marked by a method commonly referred to as "fire branding", i.e. by the application of a hot branding tool. Alternatively, natural corks may also be branded by application of colors or dyes. Due to food safety concerns, marking of natural corks with colors or dyes is generally only effected on the curved cylindrical surface of the cork that is not in direct contact with the wine. On the other hand, marking on the flat terminating surfaces of natural corks is generally effected by means of fire branding only since this method does not impose any food safety concerns.

It is also known to brand synthetic closures. Synthetic closures are commonly branded by means of inkjet printing using special dyes or colors approved for indirect food contact. Since such colors and dyes are normally not approved for direct food contact marking of synthetic closures with colors or dyes is generally only effected on the curved cylindrical surface of the cork that is not in direct contact with the wine. Therefore, marking on the flat terminating surfaces of synthetic closures is generally only known for injection molded closures, where marking is effected during the molding process of the closure by providing raised portions on the flat terminating surfaces.

Methods are available for marking the flat terminating surface of synthetic closures that have been manufactured by means of extrusion, in particular by co-extrusion. Laser marking may, in theory, be a feasible method since it allows the avoidance of direct food contact. This method is, however, inherently slow and expensive since it requires the use of special laser dye additives. Also, there have been concerns that laser marking of the flat terminating surfaces of synthetic closures may adversely change the foam structure of the core element, which may, in consequence, adversely affect the sensitive gas permeation properties of such closures.

A further method involves the application of a decorative layer, in particular of a decorative plastic layer, by means of heat and/or pressure transfer. This method allows for permanent branding of synthetic closures without giving rise to concerns relating to food safety and without negatively impacting the gas permeation and/or mechanical properties of synthetic closures, in particular of co-extruded synthetic closures. It can, however, be difficult to achieve a desirable print quality.

Therefore, there exists a need for a method for producing a synthetic closure or stopper which particularly comprises at least one of the characteristic features described above, said method particularly being capable of producing a synthetic closure or stopper which has a physical appearance and/or tactile characteristics similar in at least one aspect to a natural cork closure, particularly with only minimal impairment, particularly with no impairment or even with improvement of the other properties of the closure such as, inter alia, OTR, leakage, ease of insertion and removal, compressibility and compression recovery, compatibility with food products.

There is also a need for a method for producing a synthetic closure or stopper which has improved printability on the end terminating faces.

Other and more specific needs will in part be apparent and will in part appear hereinafter.

SUMMARY

As will become evident from the following detailed disclosure, the synthetic closure of the present disclosure may be employed as a bottle closure or stopper for any desired product. However, for the reasons detailed above, wine products impose the most burdensome standards on a bottle closure. Consequently, in order to clearly demonstrate the universal applicability of the synthetic closure of the present disclosure, the following disclosure focuses on the applicability and usability of the synthetic closure of the present disclosure as a closure or stopper for wine containing bottles. However, this discussion is for exemplary purposes only and is not intended as a limitation of the present disclosure.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry also impart substantial restrictions on the bottle closure, requiring a bottle closure which is highly compressible, has high immediate compression recovery capabilities and can resist any deleterious effects caused by the clamping jaws of the bottle closure equipment.

Although prior art synthetic products have been produced in an attempt to satisfy the need for alternate bottle closures employable in the wine industry, such prior art systems have often been found lacking in one or more of the generally desirable aspects of a bottle closure for wine products. However, by employing the present disclosure, many of the prior art disadvantages have been reduced or even obviated and an effective, easily employed, mass-produced synthetic closure has been realized.

In the present disclosure, many of the prior art disadvantages can be reduced or even overcome by achieving a synthetic closure for a product retaining container constructed for being inserted and securely retained in a portal forming neck of said container and a method for producing such a synthetic closure.

In one non-limiting example, the present disclosure provides for a method for producing a closure for a product containing container constructed for being inserted and retained in a portal forming the neck of the container for sealingly closing the container, said method comprising at least the steps of:

A. extruding a continuous, elongated, substantially cylindrically-shaped length of a material;

B. cutting said elongated length of material in a plane substantially perpendicular to the central axis of said elongated length of material using a knife blade, said knife blade comprising at least one cutting edge region having a discontinuous cutting edge, particularly one cutting edge region having a discontinuous cutting edge, or two cutting edge regions, at least one, particularly each of said two cutting edge regions having a discontinuous cutting edge, establishing a closure having the desired length for insertion and retention in the portal of the neck of the container.

In accordance with an exemplary aspect of the disclosure, a continuous method is provided wherein the elongated length of a material is formed by a continuous extrusion process which enables the elongated length of material to be manufactured as a continuous elongated length of material. The elongated length of material obtained in step A above is then cut in method step B above to form a cut portion which is separated by the cutting from the continuous elongated length of material, said cut portion having a length which makes the cut portion suitable for use as a closure for a container as described herein. In this way, individual closures are obtained. Method step B is particularly repeated continuously, so that the method according to the present disclosure can particularly be described as a continuous method. In this way, the elongated length of material produced in step A can be produced in a continuous production operation prior to the formation of the individual closures by cutting the elongated length of extruded material in the desired continuous manner according to method step B.

The material which has been extruded in method step A and also the corresponding cut material obtained in method step B, for example the cut portions, can also be referred to as "core", "core material", "core member", or the like, which are used interchangeably herein.

The at least one cutting edge region of the knife blade is particularly comprised in at least one tapered edge region of the knife blade. The at least one tapered edge region is particularly formed as a substantially symmetrical double-ground wedge-shape with two taper faces on opposing faces of the blade, whereby the two taper faces meet at the cutting edge. The knife blade particularly has a total blade grind in at least one cutting edge region, particularly in each cutting edge region if more than one cutting edge region is present, in the range of from about 5° to about 25°, particularly in the range of from about 6° to about 20°, particularly in the range of from about 7° to about 15°, more particularly in the range of from about 8° to about 12°, most particularly in the range of from about 9° to about 11°, whereby the total blade grind is defined by the sum of the individual angles formed by each of the taper faces with the axis which runs through and perpendicular to the at least one cutting edge of the blade. The blade grind can also be referred to as a sharpening angle.

In an exemplary aspect of the method of the present disclosure, the at least one cutting edge region is not parallel to the edge region of the knife blade which is opposite to the cutting edge region. If one cutting edge region is present, this cutting edge region has a rake angle, particularly a rake angle of less than 90°, particularly a rake angle in the range of from about 40° to about 85°, more particularly in the range of from about 50° to about 75°, more particularly in the range of from about 60° to about 70°, where the rake angle is defined as the acute angle formed by the intersection of the cutting edge region with a side edge of the knife blade. If two cutting edge regions are present, these particularly intersect each other at an intersection angle which can be about twice the rake angle defined above, particularly an intersection angle in the range of from less than 180°, particularly an intersection angle in the range of from about 70° to about 160°, more particularly an intersection angle in the range of from about 80° to about 150°, more particularly an intersection angle in the range of from about 90° to about 140°, more particularly an intersection angle in the range of from about 100° to about 130°, more particularly an intersection angle in the range of from about 110° to about 120°. A knife blade comprising two cutting edge regions is also referred to herein as a dual knife blade or as a dual blade.

At least one cutting edge region of the knife blade has a discontinuous cutting edge. If the knife blade comprises two cutting edge regions, at least one, particularly each of the two cutting edge regions has a discontinuous cutting edge. The disclosure herein regarding a discontinuous cutting edge is considered to apply to each discontinuous cutting edge independently of each other. In an exemplary aspect of the method according to the present disclosure, said discontinuous cutting edge is formed by a plurality of notches along the at least one cutting edge region. In one aspect of the method according to the present disclosure, the term "notch" particularly describes a recess in the at least one cutting edge region. The plurality of notches particularly thus forms alternating teeth and recesses along the at least one cutting edge region of the knife blade. The term "tooth" is intended to indicate a portion of the at least one cutting edge region located between two notches. Such a portion will also be referred to herein as a cutting edge portion.

In an exemplary aspect of the method of the present disclosure, the knife blade is a serrated blade. Accordingly, the notches are particularly formed by serrations on at least one face of the at least one cutting edge region, particularly serrations on both faces of the at least one cutting edge region, particularly substantially symmetrical serrations on both faces of the at least one cutting edge region, more particularly cut-out sections in the cutting edge of and passing through the at least one cutting edge region. The serrations particularly form substantially U-shaped recesses along at least a part of the at least one cutting edge region. The serrations can be oblique cut serrations or non-oblique cut serrations, or a combination thereof.

The notches, particularly the serrations, can be described by means of their dimensions such as shape, pitch, depth and width. The notches can have any shape which appears suitable to the skilled person for cutting the elongated length of material according to method step B. Exemplary notch shapes are, for example, substantially rounded shapes such as U-type shapes, since these contribute to satisfying the above-mentioned needs and substantially do not negatively affect the strength and stability of the cutting edge.

In an exemplary aspect of the method of the present disclosure, said notches have a pitch between adjacent notches of from about 0.150 inches (about 0.381 cm) to about 0.250 inches (about 0.635 cm), particularly of from about 0.155 inches (about 0.394 cm) to about 0.240 inches (about 0.610 cm), more particularly of from about 0.160 inches (about 0.406 cm) to about 0.230 inches (about 0.584 cm), more particularly of from about 0.165 inches (0.419 cm) to about 0.220 inches (about 0.559 cm), yet more particularly of from about 0.170 inches (about 0.432 cm) to about 0.210 inches (about 0.533 cm), in particular of from about 0.175 inches (about 0.445 cm) to about 0.200 inches (about 0.508 cm). By "pitch" is understood the distance between the centres of adjacent notches.

In a further exemplary aspect of the method of the present disclosure, said notches have a width of from about 0.010 inches (about 0.025 cm) to about 0.100 inches (about 0.254 cm), particularly of from about 0.020 inches (about 0.051 cm) to about 0.085 inches (about 0.216 cm) in particular of from about 0.030 inches (about 0.076 cm) to about 0.070 inches (about 0.178 cm), in particular of from about 0.040 inches (about 0.102 cm) to about 0.060 inches (about 0.152 cm). The width describes the distance across the notch as measured at the cutting edge, i.e. the distance between two teeth.

In the method according to the present disclosure, said notches particularly have a depth of from about 0.010 inches (about 0.025 cm) to about 0.100 inches (about 0.254 cm), particularly of from about 0.015 inches (about 0.038 cm) to about 0.080 inches (about 0.203 cm), in particular of from about 0.020 inches (about 0.051 cm) to about 0.060 inches (about 0.152 cm), in particular of from about 0.030 inches (about 0.076 cm) to about 0.050 inches (about 0.127 cm). The depth is measured from the extension of the cutting edge axis to the deepest point of the notch, which, in the case of U-shaped notches, for example, is found at the mid-point of the notch.

The notches can be arranged continuously or intermittently along the cutting edge region. In an exemplary aspect of the method of the present disclosure said notches are arranged having a consistent pitch between adjacent notches. According to this aspect of the present disclosure the cutting edge portions between the notches are therefore substantially the same length as each other, so that a regular repetition of cutting edge portions and notches, or teeth and recesses, is formed along the cutting edge region.

If the knife blade comprises two cutting edge regions the disclosure herein concerning the at least one cutting edge region and all aspects thereof is considered to apply to each of the cutting edge regions and to all aspects relating to the cutting edge regions and the cutting in method step B.

In an exemplary aspect of the method of the present disclosure, in method step B said elongated length of material is passed through a cutting area and said knife blade is mounted for rotation through said cutting area with the knife blade being mounted in a plane substantially perpendicular to the central axis of the elongated length of material. The central axis of the elongated length of material is the longitudinal axis along the elongated direction of the elongated length. A rotating blade arrangement has the advantage of allowing a better controllability of the cutting speed compared, for example, to a guillotine-type cutter. The cutting speed is substantially related to the speed of rotation of the rotating blade. Controllability of the cutting speed is not only advantageous in terms of controlling the cut lengths, but also in terms of reducing or even eliminating so-called "backlash" through the elongated length of material, which can be caused, for example, with slower cutting speeds which affect the movement of the elongated length of material. A suitable cutting speed for the disclosed method can easily be determined by the skilled person on the basis of common general knowledge and simple trials.

In an exemplary aspect of the method disclosed herein said cutting is effected by a flyknife cutter and said knife blade is attached to a flywheel of said flyknife cutter. Suitable flyknife cutters are known to the skilled person and are commercially available. The knife blade particularly comprises conventional fixing means for fixing to the flywheel. According to an particular disclosure of the method, if a knife blade comprising two cutting edge regions is used, the flyknife cutter is capable of rotating in two opposing directions, referred to as forwards and reverse directions. According to this particular disclosure, this is advantageous in increasing the effective life of the knife blade, which helps to reduce waste, as well as reducing cutting downtime and line downtime. In an exemplary aspect of this disclosure the trailing cutting edge region substantially does not interact with the cut edge of the continuous, elongated length of material in such a way as to score or mark it.

In an exemplary aspect of the method disclosed herein said knife blade is attached to the flywheel in a manner to project radially outwardly of the radial outward extent of the flywheel. Such an arrangement has the advantage that the flywheel substantially does not need to move in and out of the extrusion as does, for example, a rotary-type blade. This helps to reduce wear on components and also helps to reduce backlash through the elongated length of material.

The knife blade can be made of any material which is known to the skilled person and suitable for cutting the elongated length of material, particularly in substantially continuous operation. The material of the knife blade should furthermore be suitable for cutting material which will come into contact with foodstuffs. According to a particular aspect of the method, said knife blade is made of stainless steel, more particularly hardened stainless steel.

According to an exemplary aspect of the disclosure, it can be advantageous to lubricate at least one of the knife blade and the elongated length of material before cutting, during cutting, or before and during cutting. Such a lubrication can, for example, contribute to preventing or reducing heating of at least one of the elongated length of material and the knife blade, and also to reducing wear on the cutting equipment. Suitable lubricants are lubricants which have substantially no disadvantageous effect on the material of the elongated length of material, and which are compatible with foodstuffs, particularly lubricants which are also or alternatively easily removable after cutting, for example by washing or by evaporation, particularly evaporation, particularly evaporation in air, particularly before the closure is used to close a container, or which have substantially no effect on the contents of the container. Lubricants which are considered for use in the disclosed method are, for example, water, ethanol, propanol, or combinations thereof.

The cut sections of material obtained in method step B can optionally be beveled or chamfered. Although any desired bevel or chamfered configuration can be employed, such as a radius, curve, or flat surface, it has been found that merely cutting the terminating ends at the intersection with the longitudinal cylindrical surface of the elongated length of material, with or without at least one peripheral layer as described herein, at an angle in the range of from about 30° to about 75°, for example in the range of from about 35° to about 70°, particularly in the range of from about 40° to about 65°, allows formation of a closure which is easier to insert into the neck of a container. Angles of about 45°, 46°, 47°, 48°, 49°, 50°, 51°, 52°, 53°, 54°, 55°, 56°, 57°, 58°, 59° or 60° have been found particularly to contribute to the present disclosure. The bevel or chamfer angle is measured relative to the longitudinal axis of the elongated length of material. A further advantage of a beveled or chamfered configuration is the reduction or removal of plastic material which may, for example, result from the cutting in method step B, for example in the form of fine strands or hairs, and which is not completely removed by the cutting in method step B or subsequent method steps or treatments of the closure.

In addition to attaining a core member which possesses a construction with physical characteristics similar to natural cork, the synthetic closure obtained by the method of the present disclosure can also comprise at least one peripheral layer. The at least one peripheral layer is generally desirable in attaining a synthetic bottle closure which is suitable as a closure or stopper for the wine industry.

Due to the operation of the cooperating jaws which are employed to compress the stopper for insertion into the bottle, sharp edges of the jaw members are forced into intimate contact with the outer surface of the stopper. Although cork material has been successful in resisting permanent damage from the jaw edges in most instances, other prior art synthetic stoppers have been incapable of resisting these cutting forces. As a result, longitudinal cuts, score lines or slits are formed in the outer surface of the stopper, enabling liquid to seep from the interior to the exterior of the bottle. This disadvantage, existing with prior art cork and synthetic closures, can be reduced or even eliminated by incorporating at least one peripheral layer which surrounds and envelopes substantially the entire outer longitudinal surface of the substantially cylindrical elongated length of material obtained in method step A. In addition, by forming at least one peripheral layer from high density, rugged, score-resistant material, the method of the present disclosure provides a synthetic bottle closure which contributes to reducing or even overcoming the prior art disadvantages. According to an exemplary aspect of the present disclosure, a synthetic bottle closure is realized by forming an outer layer peripherally surrounding the elongated length of material obtained in method step A in intimate, bonded, interengagement therewith. The method according to the present disclosure therefore particularly comprises, particularly prior to method step B, particularly substantially simultaneously with method step A or after method step A or both, the following additional step:

A.1 separately extruding a separate and independent peripheral layer of plastic material in intimate bonded engagement with said continuous, elongated length of material, said separate and independent layer of plastic material peripherally surrounding and substantially enveloping the cylindrical surface of the continuous, elongated length of material and forming a multi-component elongated length of material.

The multi-component elongated length of material thus in turn is formed with a cylindrical outer surface. If one or more further peripheral layers are to be formed, these can be formed by repeating method step A.1, wherein the one or more further peripheral layers are separately extruded in intimate bonded engagement with the cylindrical outer surface of the multi-component elongated length of material to form a multilayer elongated length of material.

If method step A.1 is carried out and/or repeated before method step B, the multi-component elongated length of material or the multilayer elongated length of material is cut in method step B.

If at least one peripheral layer is formed, the closure obtainable by means of the method of the present disclosure should particularly be formed with the at least one peripheral layer intimately bonded to substantially the entire surface of the continuous, elongated length of material. If any large unbonded areas exist, flow paths for gas and liquid could result. Consequently, secure, intimate, bonded interengagement of the at least one peripheral layer with the continuous, elongated length of material is advantageous for attaining a bottle closure for the wine industry.

In order to achieve this integral bonded interconnection between the at least one peripheral layer and the continuous, elongated length of material, the at least one peripheral layer is formed about the continuous, elongated length of material in a manner which assures intimate bonded engagement. Particularly, the desired secure, intimate, bonded, interengagement is attained by simultaneous co-extrusion of the at least one peripheral layer and the continuous, elongated length of material or by applying the at least one peripheral layer to the continuous, elongated length of material after the continuous, elongated length of material has been formed. By employing either process, intimate bonded interengagement of the at least one peripheral layer to the continuous, elongated length of material is attained.

By using equipment well known in this industry, the closure of the present disclosure can be produced by co-extruding the continuous, elongated length of material simultaneously with at least one peripheral layer to provide a final product wherein the at least one peripheral layer is intimately bonded to the continuous, elongated length of material in a single, continuous operation. If such a co-extrusion process is employed, once the continuous elongated co-extruded layers forming the closure have been completely formed and are ready for final processing, the elongated dual- or multiple-component material produced is cut as described above to the precise length desired for forming closures.

In an alternative aspect, the continuous, elongated length of material is formed as an elongated, continuous, extruded foam product in method step A and is cooled or allowed to cool until ready for subsequent processing. Then, whenever desired, the continuous, elongated length of material is fed through a cross-head machine which enables at least one peripheral layer to be formed and positioned in the desired location peripherally surrounding the continuous, elongated length of material in intimate bonded interengagement therewith according to method step A.1.

In this way, the elongated length of material produced in step A can be produced and substantially peripherally enveloped by the at least one separate and independent layer of plastic material according to method step A.1 in a continuous or discontinuous production operation, prior to the formation of the individual synthetic closure members by cutting the elongated length of extruded material, the multi-component elongated length of material or the multilayer elongated length of material in the desired manner as described above.

After each closure has been formed with the desired length, the desired chamfer, if needed, is formed at each end of the peripheral layer in order to provide the benefits detailed above. Once the chamfer or radius has been achieved, the closure is ready for distribution to the desired consumer, unless appropriate coatings and/or printing will be applied. Particularly, the closure is coated with a suitable lubricant, such as, for example, silicone coating before distribution to the desired consumer.

The closure produced by the method of the present disclosure is particularly further defined as being a synthetic closure. The term "synthetic" is intended to refer to at least one, particularly to each of the materials from which the closure is formed. The material or materials of at least one of the core member and the at least one peripheral layer, for example, particularly comprise, more particularly consist of, at least one synthetic material, particularly at least one polymer.

According to an exemplary aspect of the method according to the present disclosure, said closure particularly comprises one or more thermoplastic polymers. Particularly at least one, particularly both of the core material and the material of the at least one peripheral layer comprise one or more thermoplastic polymers. In an exemplary aspect, the at least one peripheral layer is formed from plastic material identical or similar to the plastic material employed for the core member. However, as detailed herein, the physical characteristics imparted to the peripheral layer particularly differ substantially from the physical characteristics of the core member.

The closure obtained by the method according to the present disclosure is particularly wholly or partially foamed. In a particular aspect of the method, the core material is at least partially foamed, particularly being substantially foamed. The peripheral layer can also be at least partially foamed. However, the at least one peripheral layer is formed with a substantially greater density than the core material, in order to impart desired physical characteristics to the synthetic bottle closure of the present disclosure. According to an exemplary aspect of the method according to the present disclosure, the core member is foamed and the at least one peripheral layer is substantially not foamed, particularly not foamed.

Where the closure obtained by the method according to the present disclosure is foamed, it is advantageous that the cell size and/or cell distribution in the foam, particularly in the core member, are substantially uniform throughout the entire length and/or diameter of the foamed material, particularly of the core member. In this way closures with substantially uniform properties, such as, for example OTR, compressibility and compression recovery, can be obtained.

It is further advantageous according to the present disclosure that the foam is further defined as being substantially closed cell foam. In particular, the core member is exemplarily defined as comprising substantially closed cells. Closed cell foams are generally defined as comprising pores, also referred to as cells, which are substantially not interconnected with each other. Closed cell foams have higher dimensional stability, lower moisture absorption coefficients, and higher strength compared to open-cell-structured foams.

In order to assure that the core member of the closure possesses inherent consistency, stability, functionality and capability of providing long-term performance, the cell size of the foamed core material is particularly substantially homogeneous throughout its entire length and diameter. The foam is thus particularly further defined as having a cell size characterized by a range of from about 0.025 mm minimum to about 0.5 mm maximum, in particular from about 0.05 mm minimum to about 0.35 mm maximum. The cell size is measured according to standard test methods known to the skilled person.

In order to control the cell size of the continuous, elongated length of material and therefore the cell size in the core member of the closure, and attain the desired cell size detailed above, a nucleating agent can be employed. In a particular embodiment, it has been found that by employing a nucleating agent selected from the group consisting of calcium silicate, talc, clay, titanium oxide, silica, barium sulfate, diatomaceous earth, and mixtures of citric acid and sodium bicarbonate, the desired cell density and cell size is achieved.

As is well known in the industry, a blowing agent can be employed in forming extruded foam plastic material. In the present disclosure, a variety of blowing agents can be employed during the extruded foaming process whereby core member is produced. Typically, either physical blowing agents or chemical blowing agents are employed. Suitable blowing agents that have been found to be efficacious in producing the core member of the present disclosure comprise one or more selected from the group consisting of: aliphatic hydrocarbons having 1-9 carbon atoms, halogenated aliphatic hydrocarbons having 1-9 carbon atoms and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons and fluorinated hydrocarbons they include, for example, methylfluoride, perfluoromethane, ethyl fluoride, 1,1-difluoroethane (HFC-152a), 1,1,1-trifluoroethane (HFC-430a), 1,1,1,2-tetrafluoroethane (HFC-134a), pentafluoroethane, perfluoroethane, 2,2-difluoropropane, 1,1,1-trifluoropropane, perfluoropropane, perfluorobutane, perfluorocyclobutane. Partially hydrogenated chlorocarbon and chlorofluorocarbons for use in this disclosure include methyl chloride, methylene chloride, ethyl chloride, 1,1,1-trichlorethane, 1,1-dichlorol-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromenthane (CFC 11), dichlorodifluoromenthane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depiction potential. Aliphatic alcohols include methanol, ethanol, n-propanol and isopropanol. Chemical blowing agents include azodicarbonamic, azodiisobutyro-nitride, benzenesulfonhydrazide, 4,4-oxybenzene sulfonylsemicarbazide, p-toluene sulfonylsemicarbazide, barium azodicarboxlyate, N,N'-Dimethyl-N,N'-dinitrosoterephthalamide, trihydrazinotriazine, and hydrocerol.

In a particular embodiment, inorganic (or physical) blowing agents are used in making the foamed material according to the method according to the present disclosure. Examples of inorganic blowing agents include carbon dioxide, water, air, helium, nitrogen and argon. Carbon dioxide is a particularly useful blowing agent.

According to another exemplary embodiment of the method according to the present disclosure, in order to produce the desired product, the blowing agent may be incorporated into the plastic melt in a quantity ranging from about 0.005% to about 10% by weight of the weight of the plastic material.

In an exemplary aspect according to the method according to the present disclosure that the synthetic bottle closure of the present disclosure comprises, as its principal component, a core member which is formed from extruded, foamed, plastic polymers, copolymers, or homopolymers, or blends thereof. Although any known foamable plastic material can be employed in the extrusion process for developing the bottle closure of the present disclosure, the plastic material must be selected for producing physical properties similar to natural cork, so as to be capable of providing a synthetic closure for replacing natural cork as a closure for wine bottles. By way of example, the plastic material for the core member can be a closed cell plastic material.

According to an exemplary aspect of the method of the present disclosure, therefore, said continuous, elongated, substantially cylindrically shaped length of a material comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, styrene block copolymers, ethylene-ethyl-acrylic copolymers, ionomers, polypropylenes, and copolymers of polypropylene and copolymerizable ethylenically unsaturated comonomers, olefin block copolymers and mixtures thereof. If a polyethylene is employed, in an exemplary aspect of the method disclosed herein the polyethylene comprises one or more polyethylenes selected from the group consisting of high density, medium density, low density, linear low density, ultra high density, and medium low density polyethylenes. Particularly useful plastic materials for the core element can be polyethylene, in particular LDPE, and/or ethylene-vinyl-acetate copolymer (EVA).

According to another embodiment of the method according to the present disclosure, one or more fatty acid derivatives can be added to the polymer composition which is used to prepare the continuous, elongated, substantially cylindrically-shaped length of a material in method step A. The continuous, elongated, substantially cylindrically-shaped length of a material, or core member, then further comprises a fatty acid derivative or mixtures thereof. Examples of exemplary fatty acid derivatives according to the present disclosure are fatty acid esters or fatty acid amides such as stearamides. The addition of at least one fatty acid derivative to the polymer composition of the synthetic closure imparts superior properties to the synthetic closure. In particular, it has been found that the OTR of the closure can be reduced substantially, thus further reducing unwanted oxidation of wine. In addition, it has been found that the use of a fatty acid derivative additive does not have a negative impact on the performance characteristics of synthetic corks such as extraction force, ovality control, diameter control and length control. In order to impart the desired OTR reducing effect to the closure, the fatty acid derivative, if present, is used according to an exemplary aspect of the present disclosure in a concentration from about 0.01 wt. % to about 10 wt. %, in particular from about 0.1 wt. % to about 5 wt. %, more particularly from about 1 wt. % to about 3 wt. %, based on the total weight of thermoplastic polymer.

Regardless of the foamable plastic material selected for forming the continuous, elongated, substantially cylindrically shaped length of a material, in a further exemplary embodiment of the method according to the present disclosure, said continuous, elongated, substantially cylindrically shaped length of a material is further defined as comprising a density ranging from about 100 kg/m$^3$ to about 600 kg/m$^3$. Although this density range has been found to provide an effective core member, according to an exemplary aspect of the present disclosure the density ranges from about 100 kg/m$^3$ to about 500 kg/m$^3$, in particular from about 150 kg/m$^3$ to about 420 kg/m$^3$, more particularly from about 200 kg/m$^3$ to about 350 kg/m$^3$.

In another exemplary aspect of the method according to the present disclosure, said continuous, elongated, substantially cylindrically shaped length of a material is further defined as comprising closed cells having an average cell size ranging from about 0.02 millimeters to about 0.50 millimeters, and/or a cell density ranging from about 8,000 cells/cm$^3$ to about 25,000,000 cells/cm$^3$. Although this cell configuration has been found to produce a highly effective product, it has been found that even more advantageous products comprise an average cell size ranging from about 0.05 mm to about 0.35 mm, and/or a cell density ranging from about 10,000 cells/cm$^3$ to about 8,000,000 cells/cm$^3$.

According to an exemplary aspect of the present disclosure said at least one peripheral layer is further defined as comprising one selected from the group consisting of foamed plastics and non-foamed plastics, advantageously having a substantially greater density than the core member, in order to impart desired physical characteristics to the synthetic bottle closure of the present disclosure. In particular, the composition employed for the at least one peripheral layer is particularly selected to withstand the compression forces imposed thereon by the jaws of the corking machine. However, many different polymers, as detailed herein, are able to withstand these forces and, as a result, can be employed for the at least one peripheral layer.

In exemplary aspects of the method according to the present disclosure, the at least one peripheral layer comprises one or more materials selected from foamable thermoplastic polyurethanes, non-foamable thermoplastic polyurethanes, thermoplastic polyolefins, thermoplastic vulcanizates, EPDM rubber, polyolefins, particularly flexible polyolefins, particularly polyethylenes and polypropylenes, particularly metallocene polyethylenes and polypropylenes, fluoroelastomers, fluoropolymers, fluorinated polyolefins, particularly partially fluorinated or perfluorinated polyethylenes, particularly polytetrafluoroethylenes, olefin block copolymers, styrene block copolymers, for example styrene butadiene block copolymers, thermoplastic elastomers, polyether-type polyurethanes and mixtures or blends thereof. Particular examples of the plastic material for the at least one peripheral layer are polyethylene, polypropylene, EPDM rubber, styrene block copolymers, and mixtures or blends thereof. If desired, the at least one peripheral layer can be formed from a transparent material. Furthermore, the material selected for the at least one peripheral layer may be different from that of the core member.

In order to form synthetic bottle closures with all of the desirable inherent physical and chemical properties detailed above, it has been found advantageous to comprise metallocene catalyst polyethylene in at least one peripheral layer. As detailed herein, at least one peripheral layer may comprise substantially metallocene catalyst polyethylene as single component or, if desired, the metallocene catalyst polyethylene may be combined with one or more thermoplastic elastomers, particularly with one or more thermoplastic elastomers as detailed above. In this regard, it has been found advantageous that at least one peripheral layer particularly comprises one or more polyethylenes selected from the group consisting of medium density polyethylenes, medium low density polyethylenes, and low density polyethylenes in an amount in the range of from about 5% to about 100% by weight, particularly in the range of from about 15% to about 95% by weight, particularly in the range of from about 25% to about 90% by weight, based upon the weight of the entire composition A formulation which has been found to be highly effective in providing a peripheral layer comprises at least one styrene block copolymer. Suitable styrene block copolymers which come into consideration can be selected from the group consisting of styrene ethylene butadiene styrene block copolymers, styrene ethylene butylene styrene block copolymers, styrene ethylene butylene block copolymers, styrene butadiene styrene block copolymers, styrene butadiene block copolymers, styrene isobutylene block copolymers, styrene isoprene styrene block copolymers, styrene isoprene block copolymers, styrene ethylene propylene styrene block copolymers, styrene ethylene propylene block copolymers and combinations of two or more thereof. In particular aspects of the present disclosure, the at least one styrene block copolymer is selected from the group consisting of styrene ethylene butadiene styrene block copolymers, styrene ethylene butylene styrene block copolymers, styrene ethylene propylene styrene block copolymers, styrene ethylene propylene block copolymers and combinations of two or more thereof. Examples of commercially available styrene block copolymers according to the present disclosure are SBS, SIS, SEBS, SIBS, SEPS, SEEPS, MBS, which are available, for example under the trade names Styroflex® and Styrolux® (BASF Corporation of Wyandotte, Mich., USA), Septon® (Kuraray America, Inc., Houston, Tex., USA), Maxelast® TPE (Nantong Polymax Elastomer Technology Co., Ltd), GLOBALPRENE® Polymers (LCY Chemical Corporation), Elexar® and Monprene® (Teknor Apex Company), Elastocon® series (Elastocon TPE Technologies, Inc.), TPR (Washington Penn), Evoprene™ (Alpha Gary), Versaflex®, OnFlex®, Versalloy®, Versollan®, Dynaflex® (GLS Thermoplastic Elastomers), Sevrene™ (Vichem Corporation), Vector™ (Dexco Polymers LP), Calprene® and Solprene® (Dynasol), Multiflex® TEA and Multiflex® TPE (Multibase, Inc.), Europrene® Sol T (Polimeri Europe), Sunprene™ (PolyOne), Leostomer® (Riken Technos Corporation), RTP 2700 and 6000 series (RTP), Invision® (A. Schulman), Dryflex® (VTC Elastotechnik), Quintac® (Zeon), Megol® and Raplan® (API spa), Asaprene™ and Tufprene™ (Asahi Kasei), Thermolast® (Kraiburg TPE GmbH & Co. KG, Waldkraiberg, Germany) or Kraton®, for example Kraton® D, Kraton® G or Kraton® FG (Kraton Polymers, Houston, Tex., USA).

Another formulation which has been found to be highly effective in providing a peripheral layer comprises at least one thermoplastic vulcanizate.

Another formulation which has been found to be highly effective in providing a peripheral layer which provides at least one, particularly more than one, particularly almost all or even all physical and chemical attributes to attain a commercially viable closure comprises at least one of at least one polyether-type thermoplastic polyurethane and at least one olefin block copolymer or a blend of at least two thereof.

Each of the materials disclosed as suitable for a peripheral layer can be used alone or in combination with one or more of these materials. By employing this material or these materials and forming the material or the materials in peripheral, surrounding, bonded engagement with any desired foamed core member, a highly effective, multi-layer closure is attained which is able to provide at least one, particularly more than one, particularly almost all or even all properties suitable for a wine bottle closure.

In an exemplary construction of this embodiment, the particular polyether-type thermoplastic polyurethane employed for forming the at least one peripheral layer comprises Elastollan® LP9162, manufactured by BASF Corporation of Wyandotte, Mich. (US). This compound has been found to produce an outer layer in combination with the core member which provides at least one, particularly more than one, particularly almost all or even all of the physical and chemical characteristics suitable for attaining a highly effective closure for the wine industry.

In another exemplary aspect of the present disclosure, the peripheral layer comprises thermoplastic vulcanizates (TPV). Such thermoplastic vulcanizates are well known in the art and are commercially available, for example, under the tradename Santoprene® from ExxonMobil Chemical Company of Houston, Tex. (US), Sarlink® from Teknor Apex B.V., Geleen (NL) or OnFlex® from PolyOne Inc. of Avon Lake, Ohio (US).

In addition to employing the polyether-type thermoplastic polyurethane detailed above, another composition that has been found to be highly effective in providing at least one, particularly more than one, particularly almost all or even all of the desirable attributes for at least one peripheral layer is a blend of at least one polyolefin, particularly at least one thermoplastic polyolefin and at least one thermoplastic vulcanizate. In the exemplary aspect, the blend of at least one thermoplastic polyolefin and at least one thermoplastic vulcanizate comprises the thermoplastic polyolefin in an amount in the range of from about 10% to about 90% by weight, particularly in an amount in the range of from about 20% to about 80% by weight, particularly in an amount in the range of from about 30% to about 70% by weight, particularly in an amount in the range of from about 40% to about 60% by weight, based upon the weight of the entire composition of and the thermoplastic vulcanizate in an amount in the range of from about 90% to about 10% by weight, particularly in an amount in the range of from about 80% to about 20% by weight, particularly in an amount in the range of from about 70% to about 30% by weight, particularly in an amount in the range of from about 60% to about 50% by weight, based upon the weight of the entire composition. The construction of a closure using a peripheral layer formed from this blend provides a closure which is highly suitable for use as a wine bottle closure.

A further composition that has been found to be highly effective in providing at least one, particularly more than one, particularly almost all or even all of the desirable attributes for at least one peripheral layer is a blend of at least one polyolefin, particularly at least one thermoplastic polyolefin, and at least one styrene block copolymer, or a blend of at least one thermoplastic vulcanizate and at least one styrene block copolymer. In the exemplary aspect, the blend of at least one polyolefin or at least one thermoplastic vulcanizate and at least one styrene block copolymer comprises the polyolefin or the thermoplastic vulcanizate in an amount in the range of from about 5% to about 95% by weight, or in an amount in the range of from about 20% to about 80% by weight, or in an amount in the range of from about 30% to about 70% by weight, or in an amount in the range of from about 40% to about 60% by weight, based upon the weight of the entire composition of and the styrene block copolymer in an amount in the range of from about 95% to about 5% by weight, particularly in an amount in the range of from about 80% to about 20% by weight, particularly in an amount in the range of from about 70% to about 30% by weight, particularly in an amount in the range of from about 60% to about 40% by weight, based upon the weight of the entire composition. Exemplary weight ratios of styrene block copolymer to polyolefin or thermoplastic vulcanizate are about 95:5, about 90:10, about 85:15, about 80:20, about 75:25, about 70:30, about 65:35, about 60:40, about 55:45, about 50:50, based on the total weight of styrene block copolymer and polyolefin or styrene block copolymer and thermoplastic vulcanizate. The construction of a closure using a peripheral layer formed from this blend provides a closure which is highly suitable for use as a wine bottle closure.

In a further alternate embodiment, a highly effective closure is attained by employing at least one of at least one metallocene catalyst polyethylene and at least one olefin block copolymer, either independently or in combination with at least one selected from the group consisting of low density polyethylenes, medium density polyethylenes, and medium low density polyethylenes. In this embodiment, these materials are particularly employed for both core member and peripheral layer.

Still further additional compounds which have been found to provide highly effective peripheral layers for forming closures, in accordance with the present disclosure, comprise Teflon®, fluoroelastomeric compounds and fluoropolymers. These compounds, whether employed individually or in combination with each other or with the other compounds detailed above, have been found to be highly effective in producing a peripheral layer which is capable of providing at least one, particularly more than one, particularly almost all or even all of the properties making it suitable for synthetic bottle closures.

Any of the compounds detailed herein for providing the at least one peripheral layer can be employed alone or in combination with each other, using the extrusion processes detailed above to produce a peripheral layer which is securely and integrally bonded to the core member and/or to a different peripheral layer, as a foamed outer layer or a non-foamed outer layer, or as an intermediate layer.

Depending upon the sealing process to be employed for inserting the synthetic closure produced by the method of the present disclosure in a desired bottle, additives, such as slip additives, lubricating agents, and sealing compounds may be incorporated into at least one outer, peripherally surrounding layer of the synthetic closure produced by the method of the present disclosure, for example to provide lubrication of the synthetic closure during the insertion process. In addition, other additives typically employed in the bottling industry may also be incorporated into the synthetic closure produced by the method of the present disclosure for improving the sealing engagement of the synthetic closure with the bottle as well as reducing the extraction forces necessary to remove the synthetic closure from the bottle for opening the bottle.

The at least one peripheral layer, particularly the outer peripheral layer is particularly formed with a thickness and/or a density which are capable of imparting desired physical characteristics, such as resistance to bottling conditions, to the closure produced by the method of the present disclosure. The at least one peripheral layer, particularly the outer peripheral layer is, in particular, formed with a substantially greater density than the inner core and/or with a selected thickness.

Accordingly, said at least one peripheral layer is particularly further defined as comprising a thickness ranging from about 0.05 mm to about 5 mm. Although this range has been found to be efficacious for producing a closure which is completely functional and achieves all of the desired goals, the exemplary aspect for wine bottles particularly comprises a thickness ranging from about 0.1 mm to about 2 mm, whereby exemplary lower limits for the thickness are about 0.05 mm, about 0.06 mm, about 0.07 mm, about 0.08 mm, about 0.09 mm, about 0.1 mm, about 0.2 mm, about 0.3 mm, about 0.4 mm or about 0.5 mm and exemplary upper limits for the thickness are about 1 mm, about 2 mm, about 3 mm, about 4 mm, or about 5 mm. The exemplary thickness of the at least one peripheral layer can be selected according to criteria such as, for example, the composition, physical properties and/or density of the material of the at least one peripheral layer, and the desired properties of the at least one peripheral layer.

The method according to the present disclosure particularly provides a peripheral layer with a tough, score and mar resistant surface. In this respect, it is advantageous according to this aspect of the method according to the present disclosure that said at least one peripheral layer is further defined as comprising a tough, score and mar resistant surface and/or a density ranging from about 300 $kg/m^3$ to about 1,500 $kg/m^3$, more particularly from about 505 $kg/m^3$ to about 1250 $kg/m^3$, and most particularly from about 750 $kg/m^3$ to about 1100 $kg/m^3$.

It has also been discovered that further additional additives may be incorporated into either the core member and/or the at least one peripheral layer of the synthetic closure according to the present disclosure in order to provide further enhancements and desirable performance characteristics. These additional additives incorporate antimicrobial agents, antibacterial compounds, and or oxygen scavenging materials. Suitable additives are known to the person skilled in the art. The antimicrobial and antibacterial additives can be incorporated into the closure to impart an additional degree of confidence that in the presence of a liquid the potential for microbial or bacterial growth is extremely remote. These additives have a long-term time release ability and further increase the shelf life without further treatments by those involved with the bottling of wine.

As discussed above, intimate bonded interengagement of the at least one peripheral layer to the continuous, elongated, substantially cylindrically shaped length of a material is advantageous for providing a synthetic bottle closure capable of being used in the wine industry. In this regard, although it has been found that the methods detailed above provide secure intimate bonded interengagement of the at least one peripheral layer to the continuous, elongated, substantially cylindrically shaped length of a material, alternative layers or bonding chemicals can be employed, depending upon the particular materials used for forming the continuous, elongated, substantially cylindrically shaped length of a material and the at least one peripheral layer.

If desired, bonding agents or tie layers known to the skilled person can be employed on the outer surface of the continuous, elongated, substantially cylindrically shaped length of a material in order to provide secure intimate bonded interengagement of the at least one peripheral layer therewith. If a tie layer is employed, the tie layer would effectively be interposed between the continuous, elongated, substantially cylindrically shaped length of a material and the at least one peripheral layer to provide intimate bonded interengagement by effectively bonding the peripheral layer and the continuous, elongated, substantially cylindrically shaped length of a material to the intermediately positioned tie layer. However, regardless of which process or bonding procedure is employed, all of these alternate embodiments are within the scope of the present disclosure. If more than one peripheral layer is present, such bonding agents or tie layers can similarly be employed between respective peripheral layers.

In addition, the closures obtained by the method of the present disclosure may also comprise decorative indicia such as letters, symbols, colors, graphics, and wood tones printed on at least one peripheral layer and/or one of the substantially flat terminating surfaces forming the opposed ends of said closure or stopper. Printing of these indicia can be performed in-line, during production of the closure or in a separate step after the closure has been manufactured. Accordingly, the method of the present disclosure may comprise a further step of printing on at least one of the peripheral layers and the substantially flat terminating surfaces forming the opposed ends of said closure or stopper. If a decorative printing or layer is present on one or both of the substantially flat terminating surfaces, the decorative layer generally only partially visually covers the cut face, so even with an end-printed product the method disclosed herein still results in a closure which has a visual appearance similar to natural cork.

A contribution to solving at least one of the above-mentioned needs is also made by a closure that is obtainable by a method according to the present disclosure. The closure according to the present disclosure is particularly a synthetic closure, whereby all details given above for the method according to the present disclosure also apply to the closure according to the present disclosure.

A contribution to solving at least one of the above-mentioned needs is also provided by the use of a knife blade comprising at least one cutting edge region having a discontinuous cutting edge in the manufacture of a closure for a product-containing container constructed for being inserted and retained in a portal forming the neck of the container for sealingly closing the container. The knife blade particularly comprises the features as described herein with respect to the method according to the present disclosure.

By using a method in accordance with the present disclosure, a closure can be realized which is capable of providing at least one, particularly more than one, particularly almost all or even all of the needs imposed thereupon by the wine industry, as well as any other bottle closure/packaging industry. As a result, a synthetic bottle closure can be attained that can be employed for completely sealing and closing a desired bottle for securely and safely storing the product retained therein, optionally with desired markings and/or indicia printed thereon.

The present disclosure accordingly comprises an article of manufacture possessing the features, properties, and relation of elements which will be exemplified in the article herein described, and the scope of the present disclosure will be indicated in the claims.

BRIEF DESCRIPTION OF THE DRAWINGS

For a fuller understanding of the nature and objects of the present disclosure herein described, reference should be had to the following detailed description taken in connection with the accompanying drawings, in which:

FIG. 8 is a schematic representation of a cutting area according to a further aspect of the present disclosure.

FIG. 9 shows (A) an end face and (B) a printed end face of a synthetic closure made by a method according to an aspect of the present disclosure.

DETAILED DESCRIPTION

By referring to FIGS. 1 to 9, along with the following detailed disclosure, the construction and production method for the synthetic closures of the present disclosure can best be understood. In these Figures, as well as in the following detailed disclosure, the synthetic closure of the present disclosure, and its method of production, is depicted and discussed as a bottle closure for wine products. However, as detailed above, the present disclosure, in particular the closure obtainable by the disclosed method, is applicable as a synthetic closure for use in sealing and retaining any desired product in any desired closure system. However, due to the stringent and difficult demands placed upon closures for wine products, the following detailed disclosure focuses upon the applicability of the synthetic bottle closures of the present disclosure as a closure for wine bottles. However, it is to be understood that this detailed discussion is provided merely for exemplary purposes and is not intended to limit the present disclosure to this particular application and embodiment.

Figure 1:
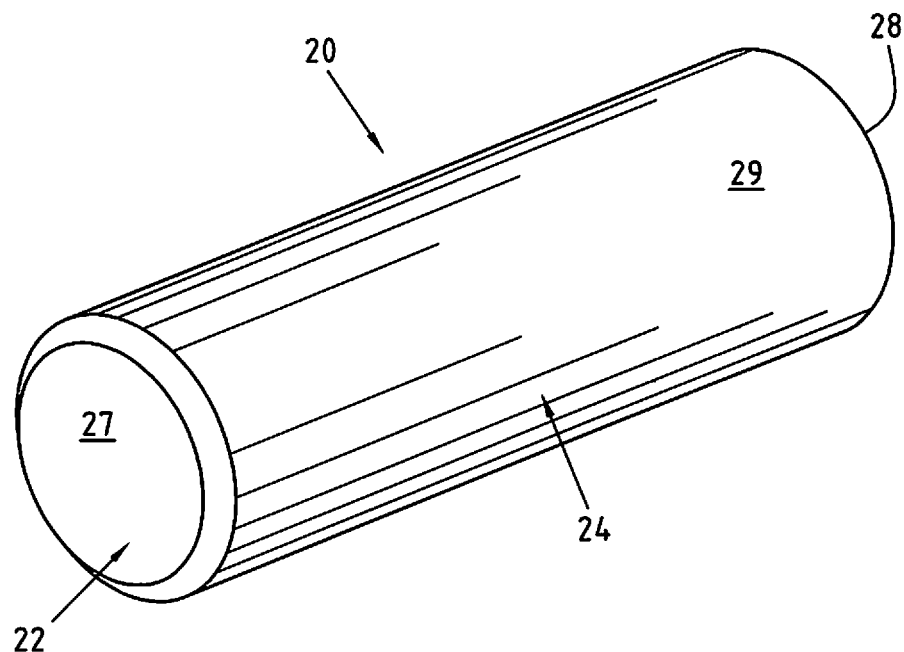
FIG. 1 is a perspective view of a synthetic closure according to an aspect of the present disclosure.
Figure 2:
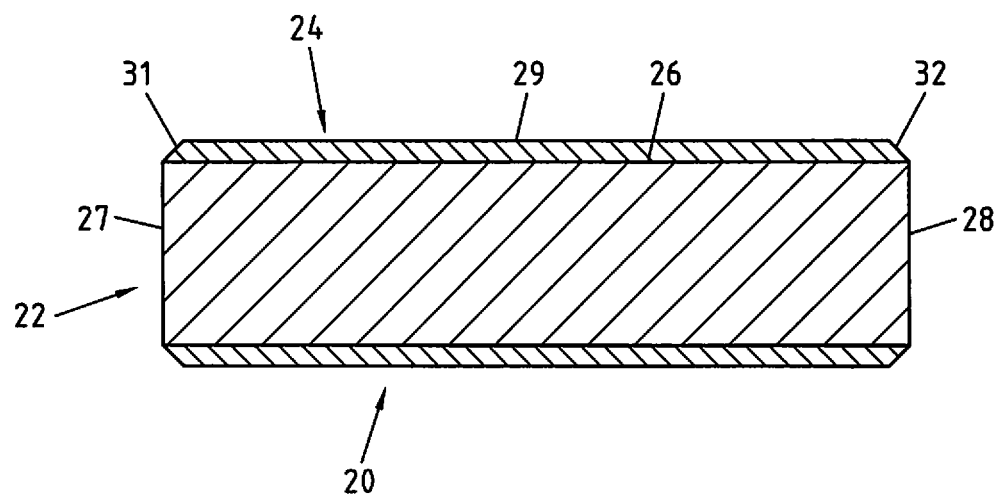
FIG. 2 is a cross sectional-side elevation of a synthetic closure according to an aspect of the present disclosure.

In FIGS. 1 and 2, the exemplary construction of a synthetic closure 20 is depicted comprising a generally cylindrical shape formed by core member 22 and peripheral layer 24 which peripherally surrounds and is intimately bonded to core member 22. In the exemplary aspect, core member 22 comprises a substantially cylindrically shaped surface 26, terminating with substantially flat end surfaces 27 and 28. Whereas such layered structure is generally considered advantageous, it should be appreciated that the closures obtained by the method of the present disclosure are not restricted to such layered products. It should be noted, however, that the synthetic closure of the present disclosure may also comprise only one single component (e.g. a foamed, partially foamed or unfoamed cylindrically shaped body made from thermoplastic material) without any additional layers. Whenever applicable, the following detailed description of a synthetic closure having a layered structure, i.e. a core member and a peripheral layer, shall also apply to such single component synthetic closures and to multilayer closures having more than one peripheral layer.

In an exemplary aspect, peripheral layer 24 is intimately bonded directly to core member 22, peripherally surrounding and enveloping surface 26 of core member 22. Peripheral layer 24 incorporates exposed surface 29, which comprises a substantially cylindrical shape and forms the outer surface of synthetic bottle closure 20 of the present disclosure, along with surfaces 27 and 28 of the substantially flat terminating ends.

In order to assist in assuring entry of synthetic bottle closure 20 into the portal of the bottle into which closure 20 is inserted, terminating edge 31 of peripheral layer 24 may be beveled or chamfered. Similarly, terminating edge 32 of peripheral layer 24 also may comprise a similar bevel or chamfer. Although any desired bevel or chamfered configuration can be employed, such as a radius, curve, or flat surface, it has been found that merely cutting ends 31 and 32 with an angle of about 45° or about 60° the desired reduced diameter area is provided for achieving the desired effect.

By incorporating chamfered or beveled ends 31 and 32 on synthetic bottle closure 20, automatic self-centering is attained. As a result, when synthetic bottle closure 20 is compressed and ejected from the compression jaws into the open bottle for forming the closure thereof, synthetic bottle closure 20 is automatically guided into the bottle opening, even if the clamping jaws are slightly misaligned with the portal of the bottle. By employing this configuration, unwanted difficulties in inserting bottle closure 20 into any desired bottle are obviated. However, in applications which employ alternate stopper insertion techniques, chamfering of ends 31 and 32 may not be needed. Further, in order to facilitate the insertion of the closure into the bottle neck, the outer surface can fully or partly be coated with suitable lubricants, in particular with silicones. Coating with lubricants such as silicones can be effected by a variety of techniques known in the art, including tumbling and/or extrusion coating.

In order to produce the attributes suitable for use in the wine industry, core 22 is formed from foam plastic material using a continuous extrusion process. Although other prior art systems have employed molded foamed plastic material, these processes have proven to be more costly and incapable of providing a final product with the attributes of the present disclosure.

Figure 3:
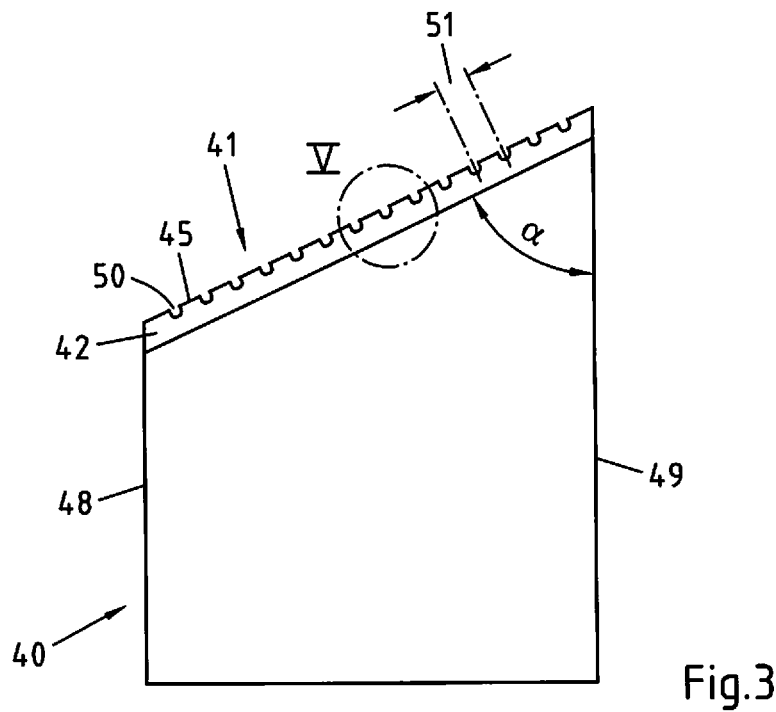
FIG. 3 is an exemplary illustration of a knife blade with serrations according to an aspect of the present disclosure.
Figure 6:
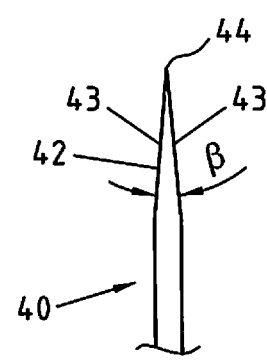
FIG. 6 illustrates a cross-sectional side elevation of a cutting edge region of a knife blade according to an aspect of the present disclosure.

FIG. 3 shows schematically an exemplary configuration of a knife blade 40 having one cutting edge region 41 according to an aspect of the disclosure. Knife blade 40 has rake angle α and blade grind β (shown in FIG. 6). Rake angle α results in knife blade 40 having a shorter side 48 and a longer side 49. Cutting edge region 41 is located in tapered edge region 42. Cutting edge region 41 comprises notches 50 separated from each other by cutting edge portions 45. Notches 50 have pitch 51, depth 52 (not shown) and width 53 (not shown). FIG. 6 provides a detailed view of a portion of cutting edge region 41.

Figure 4:
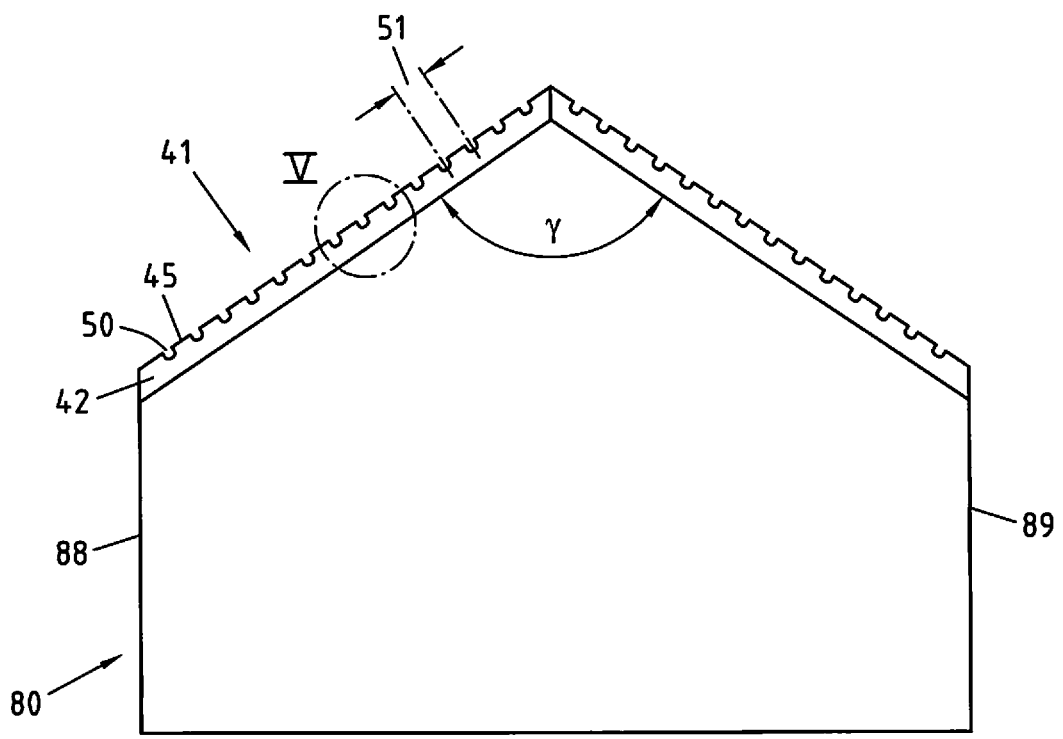
FIG. 4 is an exemplary illustration of a dual knife blade with serrations according to an aspect of the present disclosure.

FIG. 4 shows schematically an exemplary configuration of a dual knife blade 80 having two cutting edge regions 41 according to an aspect of the disclosure. Dual knife blade 80 has intersection angle γ formed by the intersection of the two cutting edge regions 41, and blade grind β. Sides 88 and 89 are substantially the same length as each other. Cutting edge region 41 is located in tapered edge region 42. Cutting edge region 41 comprises notches 50 separated from each other by cutting edge portions 45. Notches 50 have pitch 51, depth 52 (not shown) and width 53 (not shown). FIG. 6 provides a detailed view of a portion of cutting edge region 41.

For the sake of simplicity the fixing means for fixing the knife blade 40 or the dual knife blade 80 to a flywheel according to an exemplary aspect of the present disclosure are not shown.

Figure 5:
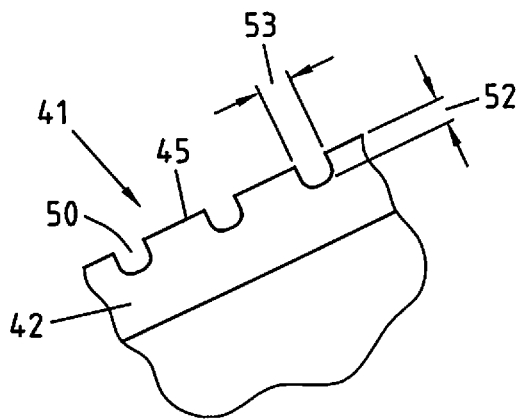
FIG. 5 illustrates a detail of the cutting edge region of a knife blade according to an aspect of the present disclosure.

FIG. 5 provides a detailed schematic view of a portion of a cutting edge region 41 of the knife blade 40 or the dual knife blade 80. FIG. 6 shows schematically a cross-sectional side elevation through the knife blade 40 or the dual knife blade 80. Cutting edge region 41 is located in tapered edge region 42 having taper faces 43. Taper faces 43 meet at cutting edge 44. Notches 50 are located at regular intervals along cutting edge 44 of cutting edge region 41, notches 50 being separated from each other by cutting edge portions 45. Notches 50 have pitch 51 (shown in FIGS. 3 and 4), depth 52 and width 53.

Figure 7:
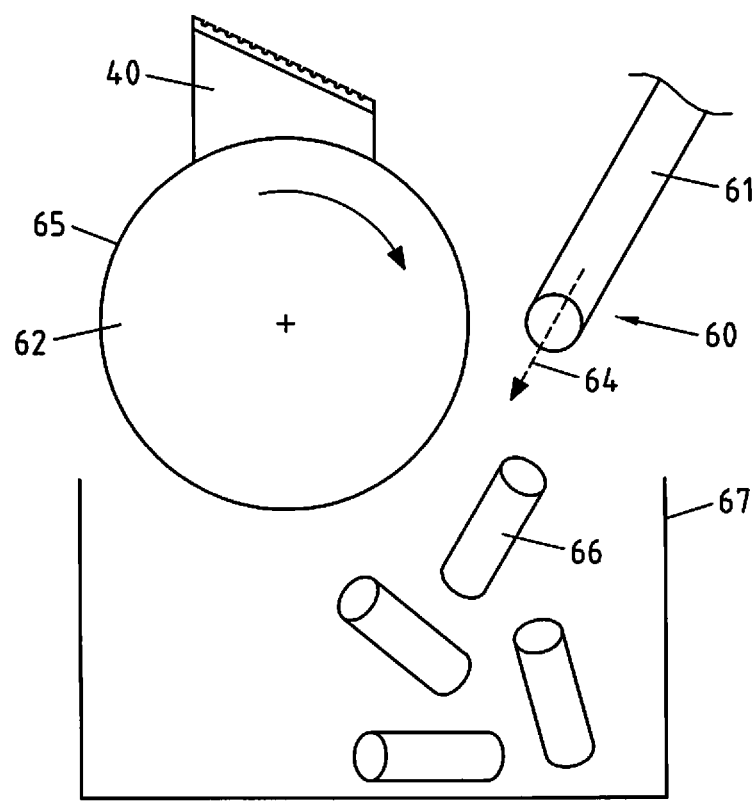
FIG. 7 is a schematic representation of a cutting area according to an aspect of the present disclosure.

FIG. 7 depicts schematically an exemplary arrangement of cutting area 60 according to an aspect of the present disclosure. Continuous elongated length of material 61 passes continuously into cutting area 60. The knife blade 40 is mounted on flywheel 62 of flyknife cutter 63 (not shown) perpendicular to the central axis 64 of elongated length of material 61 and projects radially outwardly of radial outward extent 65 of flywheel 62. Flywheel 62 is shown as rotating in one direction. It is also possible for flywheel 62 to rotate in the opposing direction, provided that knife blade 40 is mounted in such a way that the shorter side 48 of knife blade 40 is the lead side. The cut lengths 66 are collected in collector 67.

FIG. 8 depicts schematically an exemplary arrangement of cutting area 60 with a dual knife blade 80 according to a further aspect of the present disclosure. Continuous elongated length of material 61 passes continuously into cutting area 60. Knife blade 80 is mounted on flywheel 62 of flyknife cutter 63 (not shown) perpendicular to the central axis 64 of elongated length of material 61 and projects radially outwardly of radial outward extent 65 of flywheel 62. Flywheel 62 is shown as rotating in one direction. It is also possible for flywheel 62 to rotate in the opposing direction. The cut lengths 66 are collected in collector 67.

FIG. 9 shows schematically (A) an unprinted and (B) a printed terminating end face 27 or 28 obtained using the method of the present disclosure. The use of knife blade 40 or of dual knife blade 80 results in a visible profile comprising stripes 71 of raised material which alternate with stripes 72, the raised material of stripes 71 being raised with respect to the material of stripes 72. The terminating end faces can comprise from 8 to 16 stripes 71, particularly from 9 to 15 stripes 71, particularly from 10 to 14 stripes 71, more particularly from 11 to 13 stripes 71.

In order to demonstrate the efficacy of the present disclosure, samples of synthetic bottle closures 20, manufactured in accordance with the present disclosure and having a foamed core member and a solid peripheral layer were produced and tested.

Exemplary Test Methods

The tests for extraction force and compression recovery were carried out on a random sample selection according to the methods described in WO 03/018304 A1, which is hereby incorporated by reference in its entirety.

The sample products were produced on conventional co-extrusion equipment. Core member 22 was produced by employing low density polyethylene (LDPE) using an inert gas as physical blowing agent. The degree of foaming was adjusted so as to produce samples having a density of 261 $kg/m^3$, respectively. In forming peripheral layer 24, a mixture of EPDM and PP and metallocene PE was employed. In the forming process, peripheral layer 24 was formed in the extrusion equipment peripherally surrounding core member 22 and being intimately bonded thereto. The resulting products were cut according to the present disclosure, exemplified in FIG. 7 or FIG. 8 using a knife blade according to the present disclosure as shown in FIGS. 3-6, into lengths suitable for forming bottle closure 20, followed by a chamfer being formed in edges 31 and 32. The resulting closures had a diameter of 22.5 mm or of 23 mm and a length of 44 mm. The samples were then subjected to a Mocon test (OTR measurement system using 100% oxygen) in order to determine the oxygen transfer rate of the closure. The samples were also tested for the properties of extraction force and diameter recovery. As control, samples cut using a knife blade having a continuous cutting edge were subjected to the same tests. The results of the OTR measurements and the tests are shown in Table 1.

TABLE 1

| | Comparative Closure | Exemplary Closure |
| --- | --- | --- |
| OTR ($cm^3$ $O_2$/kg/day | 0.017 | 0.018 |
| Extraction Force (N): | | |
| 1 day | 265.5 | 252.5 |
| 7 days | 285.5 | 261.4 |
| 30 days | 264.7 | 278.5 |
| Compression Recovery (%) | | |
| 1 hour | 95.58 | 95.15 |
| 1 week | 95.97 | 95.79 |

TABLE 1-continued

|  | Comparative Closure | Exemplary Closure |
|---|---|---|
| 2 weeks | 96.26 | 95.72 |
| 4 weeks | 96.77 | 96.46 |

The results show that the closures produced by the exemplary method are not in any way worsened in their properties compared to the comparative closures. Furthermore, the quality and ease of printing and providing decorative indicia on the terminating end surfaces of the closures is also not impaired in the exemplary closures.

It will thus be seen that the needs set forth above, among those made apparent from the preceding description, are efficiently obtained and, since certain changes may be made in carrying out the above method without departing from the scope of this disclosure, it is intended that all matter contained in the above description or shown in the accompanying drawings shall be interpreted as illustrative and not in a limiting sense. Furthermore, it should be understood that the details of the disclosure described in the foregoing detailed description are not limited to the specific embodiments shown in the drawings but are rather meant to apply to the present disclosure in general as outlined in the summary of the present disclosure and in the claims.

It is also to be understood that the following claims are intended to cover all of the generic and specific features of the present disclosure herein described, and all statements of the scope of the present disclosure which, as a matter of language, might be said to fall there between.

We claim:

1. A method for producing a closure for a product containing container constructed for being inserted and retained in a portal forming a neck of the container for sealingly closing the container, said method comprising:
   A. extruding a continuous, substantially cylindrically shaped, elongated length of a material;
   B. passing said elongated length of material through a cutting area comprising a knife blade, said knife blade comprising at least one cutting edge region having a discontinuous cutting edge, said knife blade being mounted for rotation through said cutting area, said knife blade being mounted in a plane substantially perpendicular to a central axis of the elongated length of material; and
   C. cutting said elongated length of material in the plane substantially perpendicular to the central axis of said elongated length of material using the knife blade, thereby establishing a closure having a desired length for insertion and retention in the portal of the neck of the container.

2. The method of claim 1, wherein said at least one cutting edge region comprises two cutting edge regions, at least one of which has the discontinuous cutting edge.

3. The method of claim 1, wherein said discontinuous cutting edge comprises a plurality of notches along the at least one cutting edge region.

4. The method of claim 3, wherein said plurality of notches comprise serrations on at least one face of the at least one cutting edge region.

5. The method of claim 3, wherein said plurality of notches have a pitch between adjacent notches of from about 0.150 to about 0.250 inches.

6. The method of claim 3, wherein said plurality of notches have a width of from about 0.020 to about 0.085 inches.

7. The method of claim 3, wherein said plurality of notches have a depth of from about 0.010 to about 0.100 inches.

8. The method of claim 3, wherein said plurality of notches are arranged having a consistent pitch between adjacent notches.

9. The method of claim 1, further comprising effecting said cutting by a flyknife cutter, said knife blade being attached to a flywheel of said flyknife cutter.

10. The method of claim 1, wherein said knife blade is attached to a flywheel in a manner to project radially outwardly of a radial outward extent of the flywheel.

11. The method of claim 1, wherein said knife blade is made of stainless steel.

12. The method of claim 1, comprising, prior to cutting said elongated length of material, separately extruding at least one separate and independent peripheral layer of plastic material in intimate bonded engagement with said elongated length of material, said at least one separate and independent peripheral layer of plastic material peripherally surrounding and substantially enveloping a cylindrical surface of the elongated length of material and forming a multi-component elongated length of material.

13. The method of claim 1, wherein said closure is a synthetic closure.

14. The method of claim 1, wherein said closure comprises one or more thermoplastic polymers.

15. The method of claim 1, wherein said closure is wholly or partially foamed, such that the closure comprises a foam having a cell size and/or cell distribution therein.

16. The method of claim 15, wherein the cell size and/or cell distribution in the foam are substantially uniform throughout an entire length and/or diameter of the foam.

17. The method of claim 15, wherein the foam is further defined as being substantially closed cell foam.

18. The method of claim 15, wherein the foam further comprises a cell size characterized by a range of from about 0.025 mm minimum to about 0.5 mm maximum.

19. The method of claim 1, wherein said elongated length of material comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, styrene block copolymers, ethylene-ethyl-acrylic copolymers, ionomers, polypropylenes, and copolymers of polypropylene and copolymerizable ethylenically unsaturated comonomers, olefin block copolymers and mixtures thereof.

20. The method of claim 1, wherein said elongated length of material is further defined as comprising a density ranging from about 100 kg/m$^3$ to about 600 kg/m$^3$.

21. The method of claim 1, wherein said elongated length of material is further defined as comprising closed cells having an average cell size ranging from about 0.02 millimeters to about 0.50 millimeters and/or a cell density ranging from about 8,000 cells/cm$^3$ to about 25,000,000 cells/cm$^3$.

22. The method of claim 12, wherein said at least one separate and independent peripheral layer is further defined as comprising a material selected from the group consisting of foamed plastics and non-foamed plastics.

23. The method of claim 12, wherein said at least one separate and independent peripheral layer is further defined as comprising one or more compounds selected from the group consisting of foamable or non-foamable thermoplastic polyurethanes, thermoplastic olefins, thermoplastic vulcanizates, EPDM rubber, flexible polyolefins, fluoroelastomers, fluoropolymers, polyethylenes, polytetrafluoroethylenes, olefin block copolymers, styrene block copolymers, and blends thereof.

24. The method of claim 12, wherein said at least one separate and independent peripheral layer further comprises a thickness ranging from about 0.05 mm to about 5 mm.

25. The method of claim 12, wherein said at least one separate and independent peripheral layer further comprises a score and mar resistant surface and/or a density ranging from about 300 kg/m$^3$ to about 1,500 kg/m$^3$.

26. The method of claim 3, wherein said plurality of notches have a width of from about 0.030 to about 0.070 inches.

27. The method of claim 3, wherein said plurality of notches have a width of from about 0.040 to about 0.060 inches.

28. A method for producing a closure for a product containing container constructed for being inserted and retained in a portal forming a neck of the container for sealingly closing the container, said method comprising:

extruding a continuous, substantially cylindrically shaped, elongated length of a material; and cutting said elongated length of material in a plane substantially perpendicular to a central axis of said elongated length of material using a knife blade thereby establishing a closure having a desired length for insertion and retention in the portal of the neck of the container, said knife blade comprising at least one cutting edge region having a discontinuous cutting edge comprising a plurality of notches along the at least one cutting edge region, the plurality of notches having:

a pitch between adjacent notches of from about 0.150 to about 0.250 inches;

a width of from about 0.020 to about 0.085 inches; and a depth of from about 0.010 to about 0.100 inches.

* * * * *